United States Patent [19]

Barry et al.

[11] 4,261,611

[45] Apr. 14, 1981

[54] TRUCK CANOPY

[76] Inventors: Carmel E. Barry, 33306 S. Fraser Way, Abbotsford, British Columbia, Canada, V2S 2B4; Whitney H. Barry, 7818-123rd St., Surrey, British Columbia, Canada, V3W 3V4

[21] Appl. No.: 24,564

[22] Filed: Mar. 28, 1979

[30] Foreign Application Priority Data

Feb. 13, 1978 [CA] Canada ................................ 321537

[51] Int. Cl.³ .............................................. B60D 7/02
[52] U.S. Cl. ..................................... 296/100; 296/210
[58] Field of Search ............... 296/100, 137 R, 137 B, 296/10

[56] References Cited

U.S. PATENT DOCUMENTS

| | | | |
|---|---|---|---|
| 2,757,041 | 7/1956 | Alcorn | 296/100 |
| 2,909,387 | 10/1959 | Burtzloff | 296/100 |
| 3,866,972 | 2/1975 | Reese | 296/100 |

*Primary Examiner*—John J. Love
*Assistant Examiner*—John A. Carroll
*Attorney, Agent, or Firm*—Fulwider, Patton, Rieber, Lee & Utecht

[57] ABSTRACT

A cover assembly for a bed of a pickup truck has a continuous perimeter frame with a front member for resting on the front wall of the bed, two parallel side members for resting on the side walls of the bed and a rear member for extending over the tailgate. A beam member extends between the front and back members of the perimeter frame midway between the side members and parallel thereto. A pair of cover panels are pivotally connected to the beam member for upward and downward pivoting. Each cover panel spans an area between one side member and the beam member when pivoted downwardly in a generally horizontal position.

25 Claims, 6 Drawing Figures

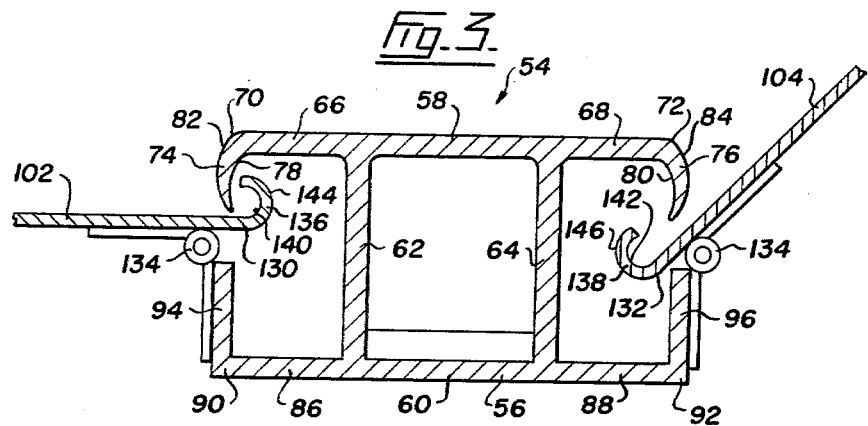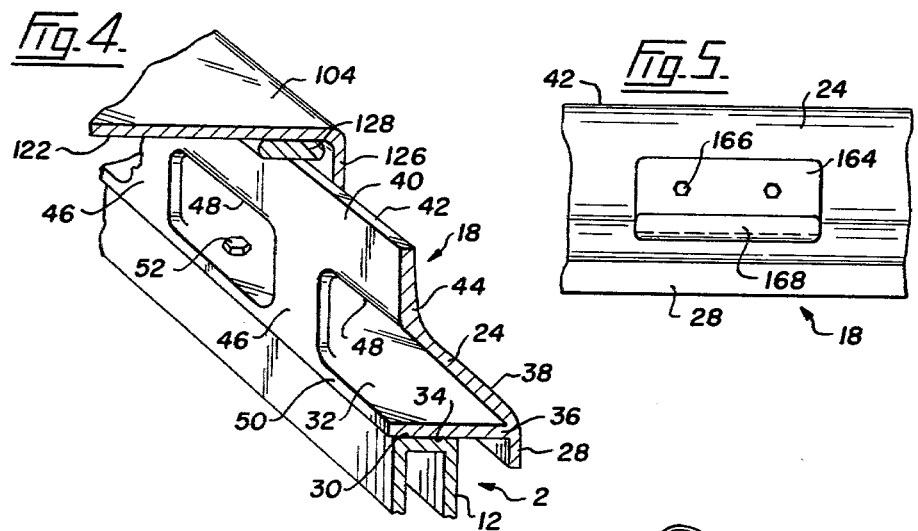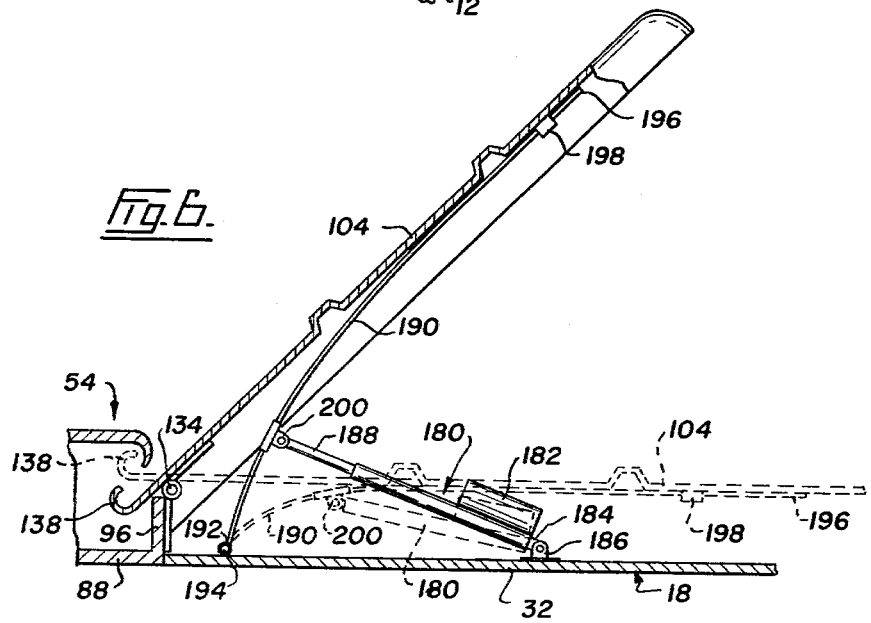

TRUCK CANOPY

BACKGROUND OF THE INVENTION

This invention relates to a cover assembly for a bed of a pickup truck.

Cover assemblies for the rear bed of a pickup truck comprising a pair of cover panels upwardly pivotal about the longitudinal center line of the truck bed are known in the prior art. These cover assemblies are designed to protect loads carried in the back of the truck from the elements and from theft. These previously known cover assemblies are deficient in certain respects, notably the type of sealing provided to seal the truck bed for moisture. Also, such cover assemblies have not been light and easy to install or remove from the truck bed as is desirable.

For example, one type of cover assembly may be seen in U.S. Pat. No. 3,866,972 to Reese. Reese provides for sealing around the periphery of the cover assembly by means of rubber gaskets resting against the tops of the side walls of the truck bed. Such sealing means has proven unreliable due to distortion of the truck bed and irregularities in the shape thereof. As well, it is possible for water to be forced between the gasket and the top of the truck bed to wet the load carried therein. Along the center line of the cover assembly, Reese provides sealing by means of an upwardly opening U-shaped central frame member and downwardly extending rims on the inside edges of the cover panels overlapping the upwardly extending flanges of the central frame member. However, during winter conditions, the U-shaped frame member may be filled with ice and snow, preventing the opening of the cover panels.

Another such cover assembly is disclosed in U.S. Pat No. 3,420,570 Kunz. Again, Kunz depends upon sealing between the cover panels and the top of the truck bed. For sealing along the center line of the assembly, Kunz depends upon a sheet of rubber material covering a single hinge or several smaller hinges. This rubber material is subject to deterioration and damage, particularly when it flexes as the cover panels are opened.

U.S. Pat. No. 3,514,152 to Hermon discloses another cover assembly for truck beds. Hermon also depends upon weather stripping between the top of the truck bed and the covers for sealing.

Other cover assemblies are found in U.S. Pat. Nos. 3,765,717; 4,079,989, and 2,757,041.

SUMMARY OF THE INVENTION

The present invention provides a cover assembly for a bed of a pickup truck or the like, the bed having an upstanding front wall and side walls, a floor and a rear tailgate pivotally connected near a rear end of the floor. The cover assembly comprises a continuous perimeter frame having a front member for resting on the front wall of the bed, two parallel side members for resting on the side walls of the bed and a rear member for extending over the tailgate. A beam member extends between the front and back members of the perimeter frame midway between the side members and parallel thereto. A pair of cover panels are pivotally connected to the beam member for upward and downward pivoting. Each cover panel spans an area between one side member and the beam member when pivoted downwardly in a generally horizontal position.

Where each cover panel has a front edge extending along the front member of the perimeter frame, an outside edge extending along one said side member and a rear edge extending along the rear member, the cover assembly may comprise sealing means between the front member and the front edges, between the outside edges and the side members and between the rear edges and the rear member.

Preferably, where the walls of the truck bed have a top, the perimeter frame has an outer downwardly extending portion for extending below the top of the truck bed walls.

Where the perimeter frame has a top, the outside, rear and front edges of each cover panel may have downwardly extending portions and a resilient strip extending along each panel inwardly from the downwardly extending portions. The downwardly extending portions may comprise a substantially vertical peripheral flange on the front, rear and outside edges of each panel extending below the top of the perimeter frame when the cover panels are in the horizontal position.

The beam member may have downwardly extending flanges to each side thereof extending from near the front member of the perimeter frame to near the rear member. Each cover panel may extend inwardly beneath one said downwardly extending flange of the beam member to an inside edge extending from near the front member of the perimeter frame to near the rear member. The inside edge of each panel may have an upwardly extending flange. Preferably, the downwardly extending flanges of the beam are inwardly concave and the upwardly extending flanges of the cover panels are outwardly concave.

In drawings which illustrate embodiments of the invention:

FIG. 3 is a sectional view of the beam member and part of the cover panels of the cover assembly shown in FIG. 1 taken along line 3—3 of FIG. 2;

FIG. 4 is an enlarged fragmentary perspective view of a portion of the right side member of the perimeter frame of the cover assembly shown in FIG. 1 and a portion of the right cover panel;

FIG. 5 is an enlarged fragmentary elevational view of the right side member of the perimeter frame shown in FIG. 1 and showing a roof rack fitting connected thereto; and FIG. 6 is a rear end view, partly broken away, of an alternative embodiment of the invention with a power lift mechanism.

DESCRIPTION OF THE PREFERRED EMBODIMENTS

Figure 1:
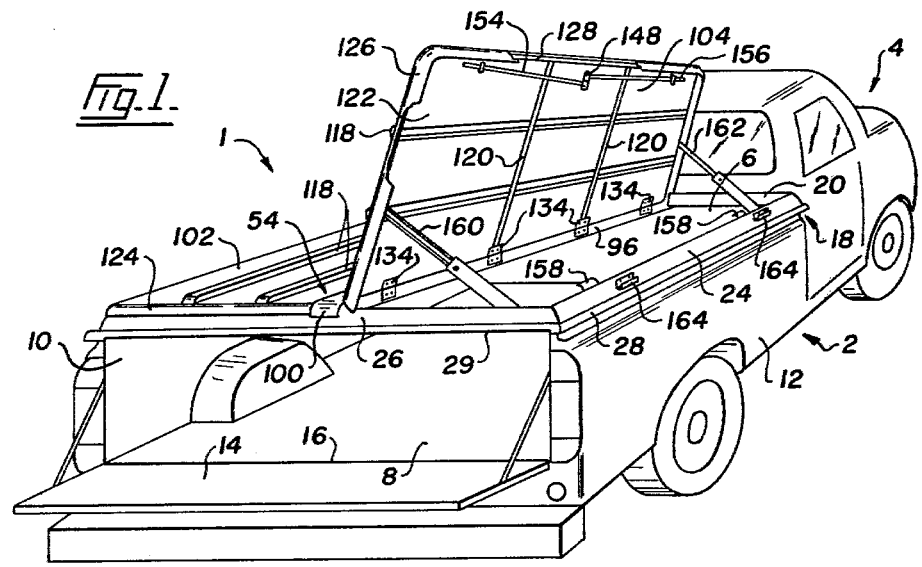
FIG. 1 is a perspective view of panel truck with a cover assembly according to an embodiment of the invention mounted on the truck bed, the rear edge and outside edge of the right cover panel being broken away.

Referring to the drawings, FIG. 1 shows a cover assembly 1 for the bed 2 of a pickup truck 4. The bed 2 has an upstanding front wall 6, a floor 8, opposing side walls 10 and 12 and a rear tailgate 14 pivotally connected near a rear end 16 of the floor 8.

Figure 2:
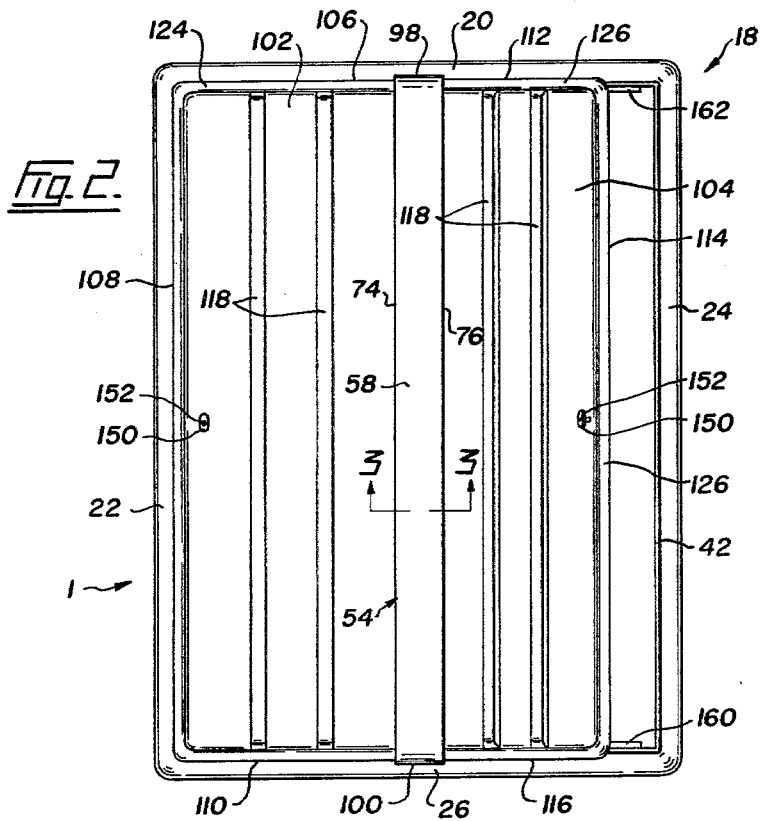
FIG. 2 is a top plan view of the cover assembly shown in FIG. 1.

As seen in FIGS. 1 and 2, cover assembly 1 has a continuous perimeter frame 18 with a front member 20 for resting on the front wall 6 of the bed 2, two parallel side members 22 and 24 for resting on the side walls 10 and 12 of the bed 2 and a rear member 26 for extending over the tailgate 14 when the tailgate is pivoted to the upright position from the horizontal position shown in FIG. 1. The members 20, 22, 24, and 26 are connected together to form an integral perimeter frame. As seen in FIG. 1 and FIG. 4, the perimeter frame 18 has a peripheral downward extension comprising a continuous flange 28 for extending below the top 30 of the truck bed 2 outwardly therefrom. A portion 29 of the flange 28 above tailgate 14 is raised to permit the opening and closing of the tailgate. As seen in FIG. 4 for side member 24, each member of frame 18 has an elongate flat strip 32 with a flat bottom 34 for resting on the top 30 of the truck bed. The flat strips 32 have an outer edge 36. Flange 28 extends downwardly from the outer edge 36 and a curved portion 38 of the perimeter frame 18 is connected to edge 36 and extends upwardly and inwardly therefrom. A vertical flange 40 with a top 42 extends upwardly from the upper part 44 of the curved portion 38. A plurality of vertical support 46 connect the bottom 48 of the vertical flange 40 to the inside edge 50 of the flat strip 32. A plurality of bolts 52 fitted through suitable apertures in flat strip 32 are used to connect the perimeter frame 18 to the truck bed 2.

The cover assembly 1 has a beam member 54 extending between the front member 20 and the rear member 26 of the perimeter frame 18 midway between the side members 22 and 24 and parallel thereto. As seen in the sectional view of FIG. 3, the beam member 54 comprises a rectangular tube 56, in this case a square tube, with a top 58, a bottom 60 and parallel vertical sides 62 and 64. Beam member 54 has a pair of upper horizontal flanges 66 and 68 with outer edges 70 and 72 respectively extending laterally outwards from the top 58 of the rectangular tube 56. Downwardly extending flanges 74 and 76 are connected to the outer edges 70 and 72 respectively. Flanges 74 and 76 extend from the front member 20 to the rear member 26 of the perimeter frame 18. These flanges 74 and 76 have inward concave surfaces 78 and 80 an outwardly convex surfaces 82 and 84. The beam member 54 also has a pair of lower horizontal flanges 86 and 88 extending laterally outwards from the bottom 60. Flanges 86 and 88 have outer edges 90 and 92 and a pair of vertical flanges 94 and 96 extend upwardly therefrom. As seen in FIG. 1 and FIG. 2, the top 58 and upper horizontal flanges 66 and 68 of the beam member 54 have a forward portion 98 extending forwardly and downwardly over the front member 20 of the perimeter frame 18. The beam member 54 has a similar rear portion 100 extending rearwardly and downwardly over the rear member 26 of the perimeter frame 18.

Cover assembly 1 has a pair of rectangular cover panels 102 and 104 pivotally connected to the beam member 54 for movement between the horizontal position, shown for panel 102 in FIGS. 1 and 2, and the vertical position for panel 104 as shown. When in the horizontal position as shown, panel 102 spans the area between side member 22 and beam member 54. Similarly, when pivoted downwardly to the horizontal position, panel 104 spans the area between side member 24 and beam member 54. Panel 102 has a front edge 106 extending along the front member 20 of the perimeter frame 18, an outside edge 108 extending along the side member 22 and a rear edge 110 extending along rear member 26. Cover panel 104 has a corresponding front edge 112, an outside edge 114 and a rear edge 116. Panels 102 and 104 are identical and have a plurality of longitudinally extending corrugations 118 for rigidity as well as a pair of laterally extending ribs 120 on the underside 122 thereof. As seen in FIGS. 1, 2 and 4, the outside, rear and front edges of the cover panels 102 and 104 extend outwardly over the vertical flange 40 of the perimeter frame 18. The cover panels 102 and 104 have corresponding downwardly extending portions or peripheral flanges 124 and 126 extending along the front, outside and rear edges thereof. The vertical flanges 124 and 126 extend below the top 42 of the perimeter frame 18 when the cover panels are in the horizontal position as shown for panel 102 in FIGS. 1 and 2 and for panel 104 as shown in FIG. 4.

Each cover panel 102 and 104 has sealing means comprising a resilient strip 128 connected to the underside 122 inwardly from the vertical flanges 124 or 126 as seen for panel 104 in FIGS. 1 and 4. As seen in FIG. 4, when the panels are pivoted downwardly to the horizontal position to contact the perimeter frame 18, the resilient strip 128 contacts the top edge 42 to prevent the leakage of water into the bed 8 between the panels 102 and 104 and the perimeter frame 18.

Panels 102 and 104 extend inwardly beneath downwardly extending flanges 74 and 76 of beam member 54 to inside edges 130 and 132 extending from front member 20 to rear member 26 of the perimeter frame 18. A plurality of hinges 134 are spaced-apart along vertical flanges 94 and 96 of beam member 54 and are connected to the panels 102 and 104 near the inside edges 130 and 132 for the upward and downward pivoting of the panels as already mentioned. Hinges 134 are connected to panels 102 and 104 and the beam member 54 by screws, bolts and nuts or other suitable means.

Flanges 136 and 138 extend upwardly from inside edges 130 and 132 of panels 102 and 104 respectively. Flanges 136 and 138 have outwardly concave surfaces 140 and 142 respectively and inner convex surfaces 144 and 146 respectively.

Cover assembly 1 is provided with a pair of identical latches 148 for securing the cover panels 102 and 104 in the horizontal position against perimeter frame 18. Latches 148 are standard hardward items including rotatable handles 150 with central locks 152, locking rods 154 and 156 and hooks 158 connected to the perimeter frame 18 by bolts or other suitable means. The ends of the rods 154 and 156 distal the handles 154 engage or disengage with hooks 158 to latch or unlatch the cover panels.

Each of the panels 102 and 104 is equipped with a pair of telescopic braces 160 and 162 for supporting the panels in the upright position as shown for panel 104 in FIGS. 1 and 2. These are standard hardware items, commonly available, and will not be described in more detail.

A pair of accessory roof rack fittings 164 can be bolted to each of the side members 22 and 24 of the perimeter frame 18 by means of bolts 166 for fitting a standard roof rack to the cover assembly 1. The roof rack fittings 164, as shown in FIG. 5, have an upwardly extending lip 168 at the bottom thereof similar in shape to the rain gutter above the side windows of an automobile. Such a roof rack fitting permits a standard roof rack to be fitted to the truck 4 for carrying additional loads above the cover assembly 1 or for items too lengthly or bulky to fit within the truck bed 8.

The preferred material for the cover assembly 1 excluding the hardware items such as hinges 134, braces 160 and 162, latches 148 and resilient strips 128, is fibre glass reinforced plastic. When this material is used, the cover panels 102 and 104, the beam member 54 and the perimeter frame 18 can each be made integral. The construction of the cover assembly 1 including the perimeter frame 18 provides a structure which is sufficiently light in weight and rigid, when the covers 102 and 104 are secured in the downwards position by the latches 148, so that the cover assembly can be easily positioned on the truck bed 2 or removed therefrom as a single unit. When the cover assembly is positioned on the truck bed, only the bolts 52 must be fitted to secure the cover assembly in place.

To protect against rain and splashing from road surfaces, the continuous peripheral flange 28 on the perimeter frame 18 prevents water from seeping between the frame 18 and the truck bed 2. The water is directed below the top 30 of the truck bed. The resilient strips 128 on the panels 102 and 104 along the front, outside and rear edges thereof provides effective sealing against the top edge 42 of the frame 18. The sealing on the cover panels does not depend upon the possibly irregular shape of the top 30 of the truck bed 2. Between the panels 102 and 104 at the front and rear of the cover assembly, the portions 98 and 100 of the beam member 54 deflect water away from the inside of the truck bed 2. Along the inside edges 130 and 132 of the panels 102 and 104, the downwardly extending flanges 82 and 84 of beam member 54 and the upwardly extending flanges 136 and 138 of the panels prevent water from getting into the truck bed. The flanges 136 and 138 form gutters, forcing the water to drain the water to drain towards the front edges 106 and 112 or the rear edges 110 and 116 of the panels 102 and 104. The shapes of flanges 136, 138, 74 and 76 prevents panels 102 and 104 from becoming jammed due to the accumulation of ice and snow in the winter.

As shown in FIG. 6, the raising and lowering of the panels can be motorized. The need for latches 148 and braces 160 and 162 is thereby removed. The braces 160 and 162 are replaced by linear actuators 180 driven by reversing DC gearhead electric motors 182. There are four sets of linear actuators 180, located near the front edge and rear edge of both of the panels 102 and 104. The outer end 184 of each linear actuator is pivotally connected to the flat strip 32 of perimeter frame 18 by a clevis 186. The inner end 188 of each linear actuator is pivotally connected to a leaf spring 190 by means of a clevis 200. There is a leaf spring 190 at the front and rear edges of both panels. Each leaf spring 190 has an inner end 192 pivotally connected to the perimeter frame 18 by means of a link in 194. Each leaf spring 190 extends upwardly towards, but does not contact, the panel. The outside end 196 of each leaf spring passes slidably through a suitable aperture in a slide bracket 198 connected to the cover.

In operation, the linear actuator 180 is controlled by an electric motor reversing switch within the cab of the truck. When the cover is in the closed or horizontal position, as shown in dotted lines in FIG. 6, the switch in the cab is actuated to operate motor 182 in one direction to extend linear actuator 180. Actuator 180 pushes against leaf spring 190 to raise the cover to the raised position as shown in solid lines in FIG. 6. From the raised position, the switch in the cab is moved to the opposite position to reverse the motor 182 and lower the cover to the horizontal or closed position. It should be noted that as the panel is raised, leaf spring 190 slides through slide bracket 198 so that the outside end 196 approaches slide bracket 198. When the panel is lowered, the outside end 196 moves away from bracket 198. When the panel is in the lowered horizontal position, leaf spring 190 is secured to the cover panel by means of the slide bracket 198 and acts as a lock to prevent the cover panel from being raised manually.

What we claim is:

1. A cover assembly for a bed of a pickup truck or the like, the bed having an upstanding front wall and side walls, a floor, a top and a rear tailgate pivotally connected near a rear end of the floor, the cover assembly comprising:

a continuous perimeter frame having a front member for resting on the front wall of the bed, two parallel side members for resting on the side walls of the bed, a rear member for extending over a tailgate and a peripheral downward extension for extending below the top of the truck bed outwardly therefrom;

a beam member extending between the front and rear members of the perimeter frame midway between the side members and parallel thereto; and a pair of cover panels pivotally connected to the beam member for upward and downward pivoting, each cover panel spanning an area between one side member and the beam member when pivoted downwardly in a generally horizontal position.

2. A cover assembly as claimed in claim 1, the downward extension comprising a continuous flange.

3. A cover assembly as claimed in claim 1, each cover panel having a front edge extending along the front member of the perimeter frame, an outside edge extending along one said side member and a rear edge extending along the rear member, the cover assembly comprising sealing means between the front member and the front edges, between the outside edges and the side members and between the rear edges and the rear member.

4. A cover assembly as claimed in claim 3, each cover panel having an underside, the sealing means comprising a resilient strip connected to the underside of each cover panel and extending along each cover panel near the front edge, near the outside edge and near the rear edge.

5. A cover assembly as claimed in claim 4, the outside, rear and front edges of the cover panels extending outwardly over the perimeter frame.

6. A cover assembly as claimed in claim 5, the outside, rear and front edges of each cover panel having downwardly extending portions, the resilient strip extending along each panel inwardly from the downwardly extending portions.

7. A cover assembly as claimed in claim 6, the perimeter frame having a top, the downwardly extending portions comprising a substantially vertical peripheral flange on the front, rear and outside edges of each panel extending below the top of the perimeter frame when the cover panels are in the horizontal position.

8. A cover assembly as claimed in claim 1, the perimeter frame comprising a flat bottom for resting on the side walls and front wall of the truck bed.

9. A cover assembly as claimed in claim 1, each member of the perimeter frame comprising an elongate flat strip for resting on one said wall of the truck bed and a generally vertical flange extending upwardly therefrom.

10. A cover assembly as claimed in claim 9, each flat strip having an outer edge, each member having a curved portion connected to the strip near the outer edge and extending upwardly and inwardly therefrom, the vertical flange extending upwardly from the curved portion.

11. A cover assembly as claimed in claim 9, each vertical flange having a top edge.

12. A cover assembly as claimed in claim 11, each cover panel having a front edge extending along the front member, an outside edge extending along one said side member and a rear edge extending along the rear member, the cover assembly comprising sealing means between the top edge of the front member and the front edge of each cover panel, between the top edge of the side members and the outside edges of the cover panels and between the top edge of the rear member and the rear edge of each cover panel.

13. A cover assembly as claimed in claim 12, each panel having an underside, the sealing means comprising a resilient strip connected to the underside of each cover panel and extending along each cover panel near the front edge, near the outside edge and near the rear edge.

14. A cover assembly as claimed in claim 1, the beam member having downwardly extending flanges to each side thereof extending from near the front member of the perimeter frame to near the rear member.

15. A cover assembly as claimed in claim 14, each cover panel extending inwardly beneath one said downwardly extending flange of the beam member to an inside edge extending from near the front member of the perimeter frame to near the rear member, the inside edge of each panel having an upwardly extending flange.

16. A cover assembly as claimed in claim 15, the downwardly extending flanges of the beam member being inwardly concave and the upwardly extending flanges of the cover panels being outwardly concave.

17. A cover assembly as claimed in claim 16, each said cover panel being hingedly connected to the beam member beneath one said downwardly extending flange.

18. A cover assembly as claimed in claim 17, the beam member comprising a rectangular tube with a top and a bottom.

19. A cover assembly as claimed in claim 18, the beam member comprising a pair of upper horizontal flanges extending laterally outwards from near the top of the rectangular tube, each upper horizontal flange having an outer edge, the downwardly extending flanges being connected along the outer edges.

20. A cover assembly as claimed in claim 19, the beam member comprising a pair of lower flanges extending outwardly from near the bottom of the rectangular tube, the cover panels being hingedly connected to the lower flanges.

21. A cover assembly as claimed in claim 15, the beam member extending forwardly and downwardly over the cover panels and the front member of the perimeter frame and extending rearwardly and downwardly over the cover panels and the rear member of the frame.

22. A cover assembly as claimed in claim 1, the members of the perimeter frame being integral.

23. A cover assembly as claimed in claim 1 or claim 15 comprising latches for securing the cover panels in the generally horizontal position against the perimeter frame.

24. A cover assembly as claimed in claim 1 or claim 15 comprising linear actuators connecting the perimeter frame and the cover panels near the front edge and near the rear edge of the cover panels for raising the cover panels.

25. A cover assembly as claimed in claim 24, comprising a leaf spring near the front edge and near the rear edge of each cover panel, each leaf spring being pivotally connected to the perimeter frame near an inner end and being slidably connected to one of the cover panels near an outside end, each linear actuator being pivotally connected to a leaf spring and thereby connected to one of the cover panels.

* * * * *